(12) United States Patent
Loo et al.

(10) Patent No.: US 8,248,681 B2
(45) Date of Patent: Aug. 21, 2012

(54) WATER-DISPERSIBLE POLYANILINE FILMS CAPABLE OF UNDERGOING STABLE AND REVERSIBLE POLYELECTROCHROMIC TRANSITIONS

(75) Inventors: Yueh-Lin Loo, Princeton, NJ (US); Joung Eun Yoo, Plainsboro, NJ (US); Jacob Tarver, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 109 days.

(21) Appl. No.: 12/984,166

(22) Filed: Jan. 4, 2011

(65) Prior Publication Data
US 2011/0205613 A1 Aug. 25, 2011

Related U.S. Application Data

(60) Provisional application No. 61/292,662, filed on Jan. 6, 2010.

(51) Int. Cl.
*G02F 1/15* (2006.01)
(52) U.S. Cl. ........ 359/265; 359/268; 359/270; 359/272; 359/273; 359/274; 359/275; 252/586
(58) Field of Classification Search .......... 359/265–275; 252/586
See application file for complete search history.

(56) References Cited

U.S. PATENT DOCUMENTS

| | | | |
|---|---|---|---|
| 2007/0139756 A1* | 6/2007 | Agrawal et al. | 359/265 |
| 2008/0204850 A1* | 8/2008 | Agrawal et al. | 359/273 |
| 2008/0316574 A1* | 12/2008 | Baumann et al. | 359/273 |

OTHER PUBLICATIONS

Tarver et al., "Polymer Acid Doped Polyaniline is Electrochemically Stable Beyond pH 9." Chemistry of Materials, 21, 2009, pp. 280-286.
Tarver et al., "Polyaniline Exhibiting Stable and Reversible Switching in the Visible Extending into the Near-IR in Aqueous Media." Chemistry of Materials, 22, 2010, pp. 2333-2340.
Yoo et al., "Directly Patternable, Highly Conducting Polymers for Broad Applications in Organic Electronics." Proceedings of the National Academy of Sciences, 107, 5712, 2010, pp. 1-6 and Supp. Mat. pp. 1-8.
Chiang et al., "'Polyaniline': Protonic Acid Doping of the Emeraldine Form to the Metallic Regime." Synthetic Metals, 13 (1986) pp. 193-205.
Wnek, "A Proposal for the Mechanism of Conduction in for the Mechanism of Conduction in Polyaniline." Synthetic Metals, 15 (1986) pp. 213-218.
Kobayashi et al., "Polyaniline Film-Coated Electrodes As Electrochromic Display Devices." J. Electroanal. Chem., 161 (1984) pp. 419-423.
Diaz et al., "Electroactive Polyaniline Films." J. Electroanal. Chem., 111 (1980) pp. 111-114.

(Continued)

*Primary Examiner* — Evelyn A. Lester
(74) *Attorney, Agent, or Firm* — Meagher Emanuel Laks Roehling & Goldberg, LLP

(57) ABSTRACT

The present disclosure relates generally to polyaniline (PANI) materials capable of undergoing stable and reversible polyelectrochromic transitions between multiple oxidation states. More specifically, the embodiments described herein include novel PANI-PAAMPSA structures that are capable of undergoing stable and reversible transitions between the ES, LB and PB oxidation states. In some embodiments, the structures described are capable of undergoing stable transitions over a broad pH range. Also described herein are methods of preparing certain electrochromic structures.

38 Claims, 13 Drawing Sheets

OTHER PUBLICATIONS

Lukachova et al., "Electroactivity of chemically synthesized polyaniline in neutral and alkaline aqueous solutions Role of self-doping and external doping." Journal of Electroanalytical Chemistry 544 (2003) pp. 59-63.

Li et al., "The electrochemical activity of sulfonic acid ring-substituted polyaniline in the wide pH range." Synthetic Metals 149 (2005) pp. 143-149.

Hwang et al., "Morphological Modification of Polyaniline Using Polyelectrolyte Template Molecules." Synthetic Metals, 29 (1989) pp. E271-E276.

Kang et al., "Electrochemical properties of polyaniline doped with poly(styrenesulfonic acid)." Synthetic Metals, 52 (1992) pp. 319-328.

Hyodo et al., "Effect of Molecular Weight on the Ion Selective Electrochemical Polymerization of Aniline." Elecrochimica Acta, vol. 36, No. 2, pp. 357-360, 1991.

Lapkowski "Electrochemical Synthesis of Polyaniline/Poly(2-Acryl-Amido-2-Methyl-1-Propane-Sulfonic Acid) Composite." Synthetic Metals, 55-57 (1993) pp. 1558-1563.

Ivanov et al., "Template Synthesis of Polyaniline in the Presence of Poly-(2-acrylamido-2-methyl-1-propanesulfonic Acid)." Russian Journal of Electrochemistry, vol. 40, No. 3, 2004, pp. 299-304.

Yoo et al., "Improving the electrical conductivity of polymer acid-doped polyaniline by controlling the template molecular weight." Journal of Materials Chemistry, Feb. 8, 2007. 17, pp. 1268-1275.

Yoo et al., "Narrowing the size distribution of the polymer acid improves PANI conductivity." Journal of Materials Chemistry, 2008, 18, pp. 3129-3135.

Mano et al., "An Electron-Conducting Cross-Linked Polyaniline-Based Redox Hydrogel, Formed in One Step at pH 7.2, Wires Glucose Oxidase." J. Am. Chem. Soc. 2007, 129, pp. 7006-7007.

Foot et al., "Electrochromic properties of conducting polyanilines." J. Phys. D: Appl. Phys. 22 (1989) pp. 1598-1603.

Cai et al., "Preparation and electroactivity of polyaniline/poly(acrylic acid) film electrodes modified by platinum microparticles." Journal of Applied Electrochemistry 28 (1998) pp. 161-166.

Yue et al., "Sulfonic Acid Ring-Substituted Polyaniline, A Self-Doped Conducting Polymer, Molecular Crystals and Liquid Crystals Incorporating Nonlinear Optics." Mol. Cryst. Liq. Cryst., 1990, vol. 189, pp. 255-261.

Ge et al., "pH-Sensing Properties of Poly(aniline) Ultrathin Films Self-Assembled on Indium-Tin Oxide." Anal. Chem. 2007, 79, pp. 1401-1410.

Lampert, "Electrochromic Materials and Devices for Energy Efficient Windows." Solar Energy Materials 11 (1984) pp. 1-27.

Delongchamp et al., "High-Contrast Electrochromism from Layer-By-Layer Polymer Films." Chem. Mater. 2003, 15, pp. 1575-1586.

Platt, "Electrochromism, a Possible Change of Color Producible in Dyes by an Electric Field." The Journal of Chemical Physics vol. 34, No. 3 Mar. 1961, pp. 862-863.

Green et al., "A Thin Film Electrochromic Display Based on the Tungsten Bronzes." Thin Solid Films, 38 (1976) pp. 89-100.

Schoot et al., "New electrochromic memory display." Appl. Phys. Lett., vol. 23. No. 2, Jul. 15, 1973, pp. 64-65.

Sapp et al., "High Contrast Ratio and Fast-Switching Dual Polymer Electrochromic Devices." Chem. Mater. 1998, 10, pp. 2101-2108.

Kaufman et al., "Polymer-modified electrodes: a new class of electrochromic materials." Appl. Phys. Lett. 36(6), Mar. 15, 1980, pp. 422-425.

Delongchamp et al., "Layer-by-Layer Assembly of PEDOT/Polyaniline Electrochromic Devices." Adv. Mater. 2001, 13, No. 19 Oct. 2, pp. 1455-1459.

Argun et al., "Multicolored Electrochromism in Polymers: Structures and Devices." Chem. Mater. 2004, 16, pp. 4401-4412.

Thompson et al., "In Situ Colorimetric Analysis of Electrochromic Polymers and Devices." Chem. Mater. 2000, 12, pp. 1563-1571.

Gustafsson et al., "In situ spectroscopic investigations of electrochromism and ion transport in a poly (3,4-ethylenedioxythiophene) electrode in a solid state electrochemical cell." Solid State Ionics 69 (1994) pp. 145-152.

Groenendaal et al., "Poly (3,4-ethylenedioxythiophene) and Its Derivatives: Past, Present, and Future." Adv. Mater. 2000, 12, No. 7, pp. 481-494.

Gaupp et al., "Poly(3,4-ethylenedioxypyrrole): Organic Electrochemistry of a Highly Stable Electrochromic Polymer." Macromolecules 2000, 33, pp. 1132-1133.

Schottland et al., "Poly(3,4-alkylenedioxypyrrole)s: Highly Stable Electronically Conducting and Electrochromic Polymers." Macromolecules 2000, 33, pp. 7051-7061.

Sankaran et al., "High-Contrast Electrochromic Polymers from Alkyl-Derivatized Poly(3,4-ethylenedioxythiophenes)." Macromolecules 1997, 30, pp. 2582-2588.

Watanabe et al., "Electrochromism of Polyaniline Film Prepared by Electrochemical Polymerization." Macromolecules 1987,20, pp. 1793-1796.

Hong et al., "Deposition-order-dependent polyelectrochromic and redox behaviors of the polyaniline-prussian blue bilayer." Electrochimica Acta 53 (2008) pp. 6215-6227.

Hu et al., "Optical and electrical responses of polymeric electrochromic devices: effect of polyacid incorporation in polyaniline film." Solid State Ionics 161 (2003) pp. 165-172.

Bartlett et al., "Electroactivity, stability and application in an enzyme switch at pH 7 of poly(aniline)-poly (styrenesulfonate) composite films." J. Chem. Soc., Faraday Trans., 1996, 92 (20), pp. 4137-4143.

Lu et al., "Fabricating Conducting Polymer Electrochromic Devices Using Ionic Liquids." Journal of the Electrochemical Society, 151 (2) pp. H33-H39 (2004).

Bazito et al., "On the stabilization of conducting pernigraniline salt by the synthesis and oxidation of polyaniline in hydrophobic ionic liquids." Phys. Chem. Chem. Phys., 2008, 10, pp. 1457-1462.

MacDiarmid et al., "Secondary doping in polyaniline." Synthetic Metals 69 (1995) pp. 85-92.

\* cited by examiner

WATER-DISPERSIBLE POLYANILINE FILMS CAPABLE OF UNDERGOING STABLE AND REVERSIBLE POLYELECTROCHROMIC TRANSITIONS

CROSS REFERENCE TO RELATED APPLICATIONS

This application claims the benefit of U.S. provisional application No. 61/292,662, filed Jan. 6, 2010, the contents of which are hereby incorporated by reference herein.

UNITED STATES GOVERNMENT RIGHTS

This invention was made with U.S. Government support under Contract No. DMR0753148 awarded by U.S. National Science Foundation. The government has certain rights in this invention.

JOINT RESEARCH AGREEMENT

The subject matter of the present disclosure was made by, on behalf of, and/or in connection with one or more of the following parties to a joint university-corporation research agreement: Princeton University, The University of Michigan, and Global Photonic Energy Corporation. The agreement was in effect on and before the date the subject matter of the present disclosure was made, and such was made as a result of activities undertaken within the scope of the agreement.

FIELD

The present disclosure relates generally to water-dispersible polyaniline (PANI) materials capable of undergoing stable and reversible polyelectrochromic transitions between multiple oxidation states.

BACKGROUND

Reversibly variable electrochromic devices have been previously described. In such devices, the intensity of light (e.g., visible, infrared, ultraviolet or other distinct or overlapping electromagnetic radiation) is modulated by passing the light through an electrochromic medium. The electrochromic medium is disposed between two conductive electrodes, at least one of which is typically transparent, which causes the medium to undergo reversible electrochemical reactions when potential differences are applied across the two electrodes.

Electrochromic materials comprise redox-active species that can exhibit significant, lasting, and reversible changes in color upon the injection or withdrawal of electrons. Electrochemical manipulation of the redox processes in thin layers of these materials thus allows the modulation of the spectral characteristics of light that is transmitted. Upon oxidation, for instance, an electrochromic material can switch from its clear and transparent form to a colored form, or vice versa.

Devices utilizing electrochromic materials are lauded for their low power consumption due to the passive transmissive mechanism of their operation, as opposed to the active emissive mechanism associated with light emitting diodes (LEDs). Specifically, electrochromic materials require only an initial potential pulse sufficiently strong to induce the desired electrochemical reaction and accompanying chromic change; in the absence of oxidizing or reducing contaminants, this change is permanent and the device may only demand backlighting. LEDs, on the other hand, require a constant power supply for continuous photoemission. Additionally, electrochromic devices are easy to fabricate as the electrochromic materials can be coated directly onto transparent electrodes without the need for the complex patterning required for LEDs.

Electrochromism has been reported in redox-active inorganics, such as tungsten oxide, small molecule organics, such as viologen, as well as conducting polymers, such as copolymers and derivatives of polypyrrole and polythiophene. Although tungsten oxide was the first electrochromic material of commercial interest, inorganic electrochromic materials typically exhibit slow switching speeds ($10^1$-$10^2$ seconds) and have proven costly to process due to the need for high-vacuum sputtering deposition. Some small-molecule organics, though easy to process, have shown poor stability, as they easily diffuse away from the electrode and into the electrolyte.

Electrochromic polymers, alternatively, hold the promise of robust film integrity, facile film formability, and fast switching times (<1 second) between oxidation states. P-type conducting polymers, such as poly(3,4-ethylenedioxythiophene) (PEDOT) and polypyrroles, exhibit an oxidative doping mechanism that can be reversibly accessed via electrochemical processes. Oxidative doping facilitates delocalization of charge carries along the polymer backbone; the electronic excitations that accompany photoabsorption thus occur at larger wavelengths relative to those of undoped species. Oxidative doping thus results in a decrease in $\pi$-$\pi^*$ transitions in favor of lower energy polaron charge carrier transitions spectroscopically. Given that these transitions typically occur at energy levels within the visible spectrum, many conductive polymers possess intrinsic electrochromicity. PEDOT, for instance, exhibits reversible chromic shifts from dark blue ($\pi$-$\pi^*$ absorption near $\lambda=600$ nm) to virtually clear and transparent (polaron band near $\lambda=900$ nm) upon oxidation. Chemically modifying thiophene and pyrrole monomers may alter the spectral properties of their polymerized form significantly. Some derivatives may even possess multiple oxidation states, wherein the switching between oxidation states results in polyelectrochromic characteristics (i.e., multiple colored states accessible).

PANI has applications in the field of polymer electronics due to its varied polyelectrochromic effects and the unique origin of its conductive form. Unlike many other conductive polymers, such as polyacetylene and polythiophene, PANI relies on a nonredox protonic doping mechanism and is inherently more resilient to the oxidizing environment presented in ambient conditions. And unlike derivitives and copolymers of polythiophenes and polypyrroles, PANI is directly capable of multiple redox transitions without the need for chemical derivitization of the monomer.

In its fully oxidized and reduced states, PANI is electrically insulating and referred to as pernigraniline base (PB) and leucoemeraldine base (LB), respectively. The LB state is characteristically transparent ($\lambda_{max}=\sim 330$ nm), while the PB state typically possesses a dark violet color ($\lambda_{max}=\sim 550$ nm). An intermediate oxidation state containing an equal number of oxidized and reduced repeat units exists between these two extremes and is referred to as emeraldine base (EB).

The electrically conductive emeraldine salt (ES) results from exposing the emeraldine base (EB) to a proton source, which is typically green in color (ES; $\lambda_{max}=\sim 800$ nm). Early studies using small-molecule proton sources such as hydrochloric acid, sulfuric acid and camphorsulfonic acid demonstrate that while stable switching between the green ES state and the transparent LB state can be performed on ~1 second time and within a ±1V potential window in acidic media (<pH 3), such films lose electroactivity at a higher pH as the proton dopants are neutralized and the small-molecule counterions responsible for charge-balancing the doped ES state diffuse away. For example, while conductivities spanning 10-300 $S \cdot cm^{-1}$ have been observed, negligible solubility and diminished electrochemical redox behavior above pH 4 due to neutralization and subsequent dopant diffusion have also been observed. Additionally, the volatile nature of these small-molecule acids may lead to diminished conductivities upon long-term storage, compromising the stability attributed to the nonredox doping mechanism. Thus, polyelectrochromic switching, though theoretically possible with PANI, has not been practically achieved.

Several methods have been proposed to solubilize ES while retaining electroactivity (i.e., redox behavior) at elevated pH. Some methods propose the derivitization of the PANI itself; such as sulfonating the benzenoid rings to produce self-doped PANI obviates issues of dopant volatility and diffusivity while widening the electroactive range toward alkaline conditions. However, while such derivitizations can impart practical levels of solubility to the final product, the sulfonation reaction can hydrolyze PANI, thereby reducing the electrical conductivity of the resulting polymer as a consequence ($\leq 10^{-1}$ $S \cdot cm^{-1}$). As a result, the use of polyanions such as poly(acrylic acid), poly(styrene sulfonate), and poly (2-acrylamido-2-methyl-1-propane-poly(2-acrylamido-2-methyl-1-propane-sulfonic acid) (PAAMPSA) as dopants has been investigated as an alternative. It is believed that polymer acids may offer advantages over conventional small-molecule acid dopants because, for example, not all acid groups along the polymer chain participate the doping process, such that excess acid groups render water dispersibility to the conductive form of PANI.

Accordingly, there exists a need to continue to develop PANI materials having an ES state that is soluble and retains electroactivity at an elevated pH. In particular, there exists a need to develop PANI films that can undergo stable and reversible transitions between the ES, LS, and PB oxidation states, wherein the stable transitions can take place at or near a neutral pH with fast switching speeds (e.g., $10^0$-$10^1$). There is also a need to develop PANI films exhibiting transitions to the PB oxidation state without chemical degradation or decay in the optical response.

SUMMARY

Applicants herein describe a structure comprising a polychromic material that is capable of undergoing stable and reversible transitions between multiple oxidation states without undergoing substantial degradation or exhibiting a substantial change in the optical response. In some embodiments, an electrochromic structure comprises at least one conductive material and a PANI-PAAMPSA material comprising a PANI-PAAMPSA complex capable of undergoing stable transitions between emeraldine salt (ES), leucomeraldine base (LB), and penigraniline base (PB) oxidation states, wherein said stable transitions between oxidation states are reversible.

In some embodiments, the stable transitions are characterized as transitions between oxidation states that lack a substantial change in the optical response for each oxidation state after repeated cycles. In some embodiments, the lack of a substantial change in the optical response is characterized by a less than 1% change in transmittance exhibited by each of the ES, LB, and PB oxidation states.

Also described herein are methods for preparing an electrochromic structure. In some embodiments, the method comprises depositing a water-dispersible PANI-PAAMPSA material on a conductive material, and inducing the structural rearrangement of the PANI-PAAMPSA material, wherein the resulting electrochromic structure comprises a PANI-PAAMPSA complex capable of undergoing stable transitions between ES, LB, and PB oxidation states, wherein said stable transitions between oxidation states are reversible.

In some embodiments, the structural rearrangement of the PANI-PAAMPSA material is induced by solvent annealing in at least one acid. In some embodiments, the at least one acid comprises dichloroacetic acid (DCA).

It is to be understood that both the foregoing general description and the following detailed description are exemplary and explanatory only and are not restrictive of the invention, as claimed.

The accompanying drawings, which are incorporated in and constitute a part of this specification, illustrate one or more (s) described herein, and together with the description, serve to explain the principles of the concepts described herein.

DESCRIPTION

The electrochromic structures described herein may include those comprising at least one conductive material and at least one PANI material.

As used herein, the term "water dispersible" may refer to a material that is capable of dispersion in a continuous liquid medium containing a suspension of particles. The term "continuous medium" denotes an aqueous liquid that has a significant portion of water. In some embodiments, the continuous medium may comprise 100% water. In some embodiments, the aqueous medium may comprise less than 100% water, so long as the desired dispersion of material particles is still achievable.

The term "layer" or "film" refers to a coating covering a desired area. The area can be as large as an entire device or as small as the desired functional area, such as the actual visual area. Films can be formed by any conventional deposition technique, including vapor deposition and liquid deposition. Typical liquid deposition techniques include, but are not limited to, continuous deposition techniques such as spin coating/casting, gravure coating, curtain coating, dip coating, slot-die coating, spray coating, and continuous nozzle coating, as well as discontinuous deposition techniques such as ink jet printing, gravure printing, and screen printing. Layers or films may be imperfect and or discontinuous, and exhibit areas of varying thickness.

The term "conductive material" means any material that comprises a substance capable of transmitting an electrical current. A conductive material may be utilized to provide a constant or pulsed power supply. In some embodiments, the conductive material may be opaque or transparent. As used herein, a material is said to be "transparent" if it transmits at least 50% of the ambient electromagnetic radiation in a relevant wavelength.

Figure 1:
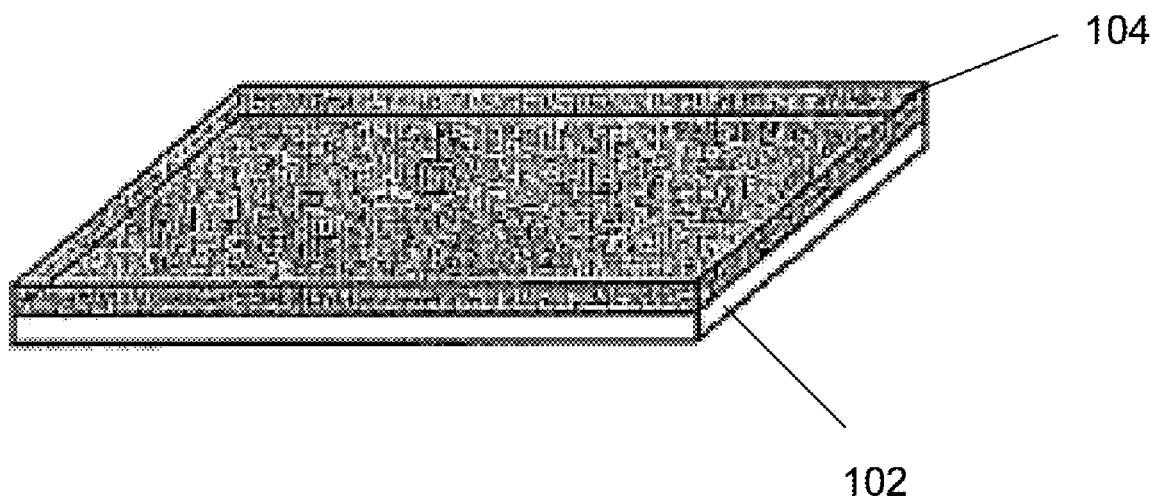
FIG. 1 is a perspective view of an electrochromic structure consistent with the embodiments described herein.

In some embodiments, the electrochromic structures described herein may comprise a conductive material and a PANI-PAAMPSA material. FIG. 1 shows exemplary electrochromic structure 100, comprising conductive material 102 and PANI-PAAMPSA material 104. As shown, conductive material 102 may comprise a substantially planar layer, while PANI-PAAMPSA material 104 may comprise a substantially uniform film adhered thereto.

In some embodiments, conductive material 102 comprises a transparent material, such as, for example, indium tin oxide (ITO), fluoride-doped tin oxide, and aluminum-doped zinc oxide, deposited on glass or another transparent substrate. In some embodiments, the conductive material may be included as part of a flexible and/or transparent substrate-conductive material (e.g., electrode-type) combination, wherein the flexible and/or transparent substrate comprises a polymeric or non-polymeric material, and the conductive material comprises an electrode-type contact.

In some embodiments, PANI-PAAMPSA material 104 comprises a PANI-PAAMPSA complex capable of undergoing stable transitions between emeraldine salt (ES), leucomeraldine base (LB), and penigraniline base (PB) oxidation states, wherein said stable transitions between oxidation states are reversible.

In some embodiments, the term "stable transitions" designates transitions between oxidation states that lack a substantial change in the optical response of each state after repeated cycles. For example, in some embodiments, the lack of a substantial change in the optical response is characterized by a less than 1% change in transmittance exhibited by each of the ES, LB, and PB oxidation states. In some embodiments, the transmittance is measured at a wavelength of 657 nanometers (nm). In some embodiments, the lack of a substantial change in the optical response is observed after the PANI-PAAMPSA complex that undergoes at least 50 switching cycles. In some embodiments, the PANI-PAAMPSA complex undergoes at least 30 switching cycles between oxidation states. An example of 30 switching cycles would include two consecutive series of five ES/PB, five ES/LB, and five LB/PB cycles, which may be conducted over varying periods of time.

As discussed above, PANI-PAAMPSA material 104 comprises a PANI-PAAMPSA complex that is capable of undergoing stable and reversible transitions between multiple oxidation states. In some embodiments, these stable transitions allow the oxidation states to exhibit a contrast in transmittance between said oxidation states that remains substantially unchanged after numerous switching cycles. For example, in some embodiments, the ES/PB transition exhibits a contrast in transmittance of greater than 30% after repeated switching cycles. In some embodiments, the ES/LB transition exhibits a contrast in transmittance of greater than 25%.

In some embodiments, the PANI-PAAMPSA complex of electrochromic structure 100 exists in the ES oxidation state. In some embodiments, the PANI-PAAMPSA complex of electrochromic structure 100 exists in the ES state from 0.0 V to 0.2 V at neutral pH. The upper limit of that potential range may increase as the pH range becomes more acidic. However, the stable transitions between oxidation states may be effected by applying a potential pulse to electrochromic structure 100. In some embodiments, electrochromic structure 100 exhibits stable transitions between the ES, LB, and PB oxidation states within a ±1 V window. For example, in some embodiments the transition between ES and LB occurs upon switching between 0.2 and −0.5 V. In some embodiments, the transition between ES and PB occurs upon switching between 0.2 and 0.9 V. In some embodiments, the transition from ES to PB occurs in 5 seconds. In some embodiments, the transition from PB to ES occurs in less than 1 second. In some embodiments, the transition from ES to LB occurs in less than 1 second. In some embodiments, the transition from LB to ES occurs in less than 1 second.

In some embodiments, electrochromic structure 100 is prepared through a process that comprises the disposal of PANI-PAAMPSA material 104 on conductive material 102. In some embodiments, the PANI-PAAMPSA material is deposited on a bisphosphonic acid-coated conductive material 102, which may improve the adhesion of the PANI-PAAMPSA material to the conductive material. In some embodiments, the desirable properties of electrochromic structure 100 may be achieved by structurally rearranging PANI-PAAMPSA material 104. In some embodiments, the structural rearrangement of the PANI-PAAMPSA material occurs after the PANI-PAAMPSA material is disposed on the conductive material. In some embodiments, the structural rearrangement may be induced by solvent annealing the PANI-PAAMPSA material in at least one acid. In some embodiments, the at least one acid comprises DCA.

In some embodiments, the structures described herein exhibit complete, stable and reversible transitions between oxidation states that may occur over a broad pH range. For example, in some embodiments, the stable transitions may occur across a range from 3 pH to 10 pH. In some embodiments, the stable transitions occur at a neutral pH (7). In some embodiments, the stable transitions occur at 5 pH. For example, FIG. 5(b) suggests that electrochromic structures comprising DCA-treated PANI-PAAMPSA films resist oxidation at a low pH, but are nonetheless easily reduced over the entire pH range while maintaining electroactive stability at an elevated pH.

Also described herein are methods for preparing electrochromic structure 100. In some embodiments, the method comprises: depositing a water-dispersible PANI-PAAMPSA material on a conductive material; and inducing a structural rearrangement of the PANI-PAAMPSA material, wherein the resulting electrochromic structure comprises a PANI-PAAMPSA complex capable of undergoing stable transitions between the ES, LB, and PB oxidation states, and wherein said stable transitions between oxidation states are reversible. In some embodiments, the water-dispersible PANI-PAAMPSA material is cast from an aqueous medium. In some embodiments, the PANI-PAAMPSA complex exists in the ES state upon deposition of the PANI-PAAMPSA material on the conductive material.

Suitable conductive materials include those described above, including transparent materials such as ITO. In some embodiments, the conductive material is modified with at least one acid. In some embodiments, the acid is bisphosphonic acid. In some embodiments, the structural rearrangement of the PANI-PAAMPSA material is induced by solvent annealing in at least one acid. In some embodiments, the at least one acid is DCA.

One of ordinary skill in the art will readily appreciate the numerous applications in which the electrochromic structures described herein may be applied. For example, the materials described herein may be useful as an organic active layer in a polyelectrochromic device, wherein the active layer can be stably and reversibly switched between distinct chromic states via electrical impulse. In some embodiments, the material could be used to selectively transmit violet, green or white light. Upon application of the impulse, the material's chromic state will persist and the electrical bias can be removed. Therefore, in some embodiments, the electrochromic structures described herein may also be suitable for use in devices comprising electronic glass/mirror/window tints, electronic displays, or other forms of electronic signage such as electronic billboards. Additionally, the structures may be used in near infrared (NIR) filters and patterened wire-grid-style polarizers that can be turned on and off through electrical input and require no manual adjustment or manipulation.

EXAMPLES

PANI-PAAMPSA was synthesized as reported by Yoo et al., *Journal of Materials Chemistry* 17 (13), 1268-1275 (2007), which is incorporated herein by reference for its disclosure of PANI-PAAMPSA synthesis. Aniline (98.9%, Fisher Scientific) was mixed with poly(2-acrylamido-2-methyl-1-propanesulfonic acid) (PAAMPSA, 10.36 wt % in water, reported $M_w$=800 kg·mol$^{-1}$, Polymer Supply, Inc.) at 75 mM in deionized water and deoxygenated under nitrogen. Ammonium peroxydisulfate (APS, 98.9%, Fisher Scientific) was dissolved in deionized water at 100 mM, deoxygenated, and added dropwise until reaching a molar ratio of 0.9:1 APS to aniline. Aniline monomer concentration at the onset of polymerization was 70 mM. The reaction vessel was immersed in an ice bath and stirred for 24 hours. After the completion of polymerization, acetone (99.7%, Fisher Scientific) was slowly added to precipitate the PANI-PAAMPSA complex. The resulting product was filtered and dried under dynamic vacuum to yield a green powder that is characteristic of ES. To generate a solution-processable dispersion, purified PANI-PAAMPSA was stirred in DI water at 5 wt % for at least 14 days prior to use.

Electrochemical studies were performed at pH 5.0 in 1.0 M acetate buffer solutions comprising sodium acetate (anhydrous, 99.0%, EMD Chemicals) and acetic acid (glacial, 100.0%, Fisher Scientific). The pH of the buffer was verified using an Orion 210 A+ pH meter. All water was purified to 18.2 MΩ using a Milli-Q Academic purification system prior to use. The buffer solutions were deoxygenated for at least 30 minutes by perfusion of nitrogen gas presaturated with water vapor through a bubbler.

Spectroelectrochemical experiments were carried out in a 1.2 mL cylindrical cell possessing a 1 cm diameter optical port. Spectral characterization was performed on PANI-PAAMPSA films across a UV-Vis/NIR spectral range of 190-1100 nm using an Agilent 8453 spectrophotometer with 1 nm resolution. Indium tin oxide (ITO, 15Ω/□, Colorado Concept Coatings) on glass was used as an optically transparent substrate for spectroelectrochemical measurements; clean ITO samples served as background. Potential step waveforms were generated using a CH-Instruments 660 Electrochemical Workstation. Platinum wire counter electrodes and silver/silver chloride reference electrodes were purchased from CH-Instruments. Silver/silver chloride reference electrodes contained, and were stored in, 3.0 M aqueous potassium chloride (99.0%, EMD Chemicals) solution.

To promote PANI-PAAMPSA adhesion to ITO, bisphosphonic acid (12-phosphonododecyl sulfonic acid, 97%, Sigma Aldrich) was first deposited using the tethering by aggregation and growth (T-BAG) self-assembly method developed by Schwartz et al., *Journal of the American Chemical Society* 125 (51), 16074-16080 (2003), and *Chemistry of Materials* 21 (2), 280-286 (2009), both of which are incorporated herein by reference for their disclosure regarding the T-Bag self-assembly method. Bisphosphonic acid was dissolved at 0.1 mM in a 95% tetrahydrofuran (THF, distilled in-house to ensure anhydrous and stabilizer free)/5% methanol (anhydrous, 99.8%, Acros Organics) solution. ITO substrates were suspended slightly below the solution-air interface. The solution was allowed to evaporate until no longer in contact with the substrate, in the process depositing the bisphosphonic acid at the air-liquid substrate interface via condensation reaction between the phosphonic acid groups and ITO's surface hydroxyl groups. The substrates were baked at 130° C. for 24 hours following solvent evaporation to drive the condensation reaction to completion. Residual bisphosphonic acid was removed by gently scrubbing the treated substrate with a cotton swab saturated with methanol followed by sonication in methanol. PANI-PAAMPSA was then deposited via spin coating a 5 wt % aqueous dispersion at speeds of 1000 and 5000 rpm and allowed to dry for at least 3 hours at ambient conditions, resulting in nominal film thicknesses of 600 and 220 nm, respectively. Films were conditioned by cycling between 0.9 and −0.5 V vs. Ag/AgCl in 1.0 M pH 5 acetate buffers solution at 10 mV·s$^{-1}$ prior to electrochromic experiments.

To induce structural rearrangement within PANI-PAAMPSA films, samples were treated with dichloroacetic acid (DCA, 99.9%, Fisher Scientific) as described by Yoo, J. E.; Lee, K. S.; Garcia, A.; Tarver, J. D.; Gomez, E. D.; Baldwin, K.; Sun, Y.; Meng, H.; Nguyen, T.-Q.; Loo, Y.-L. submitted 2009; see also U.S. patent application Ser. No. 12/574,677, both of which are incorporated herein by reference in their entireties for all purposes. After depositing PANI-PAAMPSA on bisphosphonic-acid modified ITO, films were immersed in DCA at 100° C. and vigorously agitated for approximately 3 minutes. Excess DCA was removed by blotting the sides of the substrate with tissue; residual DCA was subsequently driven off by heating the film for 30 minutes at 170° C.

The figures discussed below relate to characteristics of electrochromic structures prepared by the processes outlined above. "Pristine" PANI-PAAMPSA structures were prepared by the method outlined above, without the DCA annealing.

Figure 2:
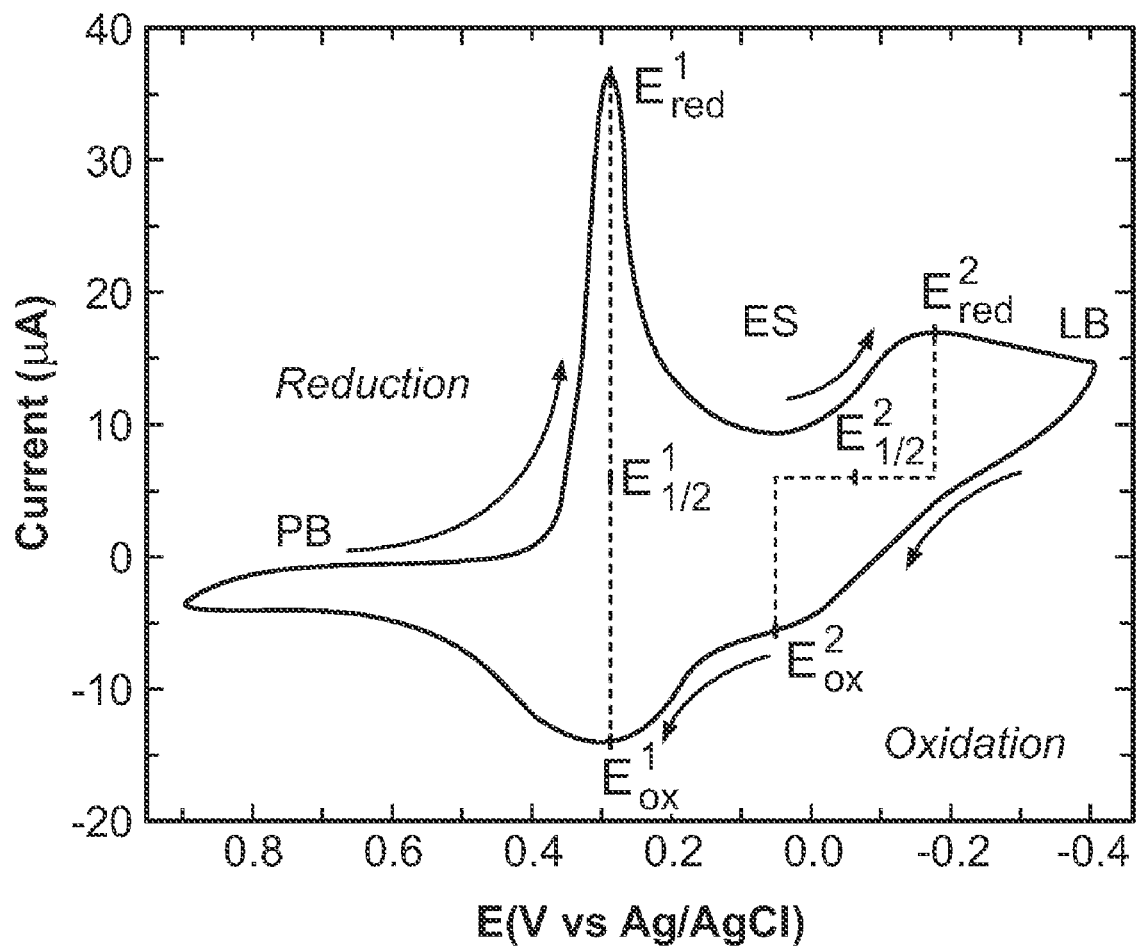
FIG. 2 shows a graph of current versus voltage (E) for bisphosphonic acid-modified ITO/pristine PANI-PAAMPSA structure.

FIG. 2 shows a graph of current versus voltage (E) for an electrochromic structure prepared in a manner consistent with the methods described herein, wherein the structure comprises a monolayer of bisphosphonic acid assembled on an ITO surface prior to the deposition of a PANI-PAAMPSA film by the T-BAG method. The film was applied by spin coating a 5 wt % (aq) solution of PANI-PAAMPSA on the treated ITO surface. The transitions for the PB, ES and LB oxidation states are noted.

Figure 3:
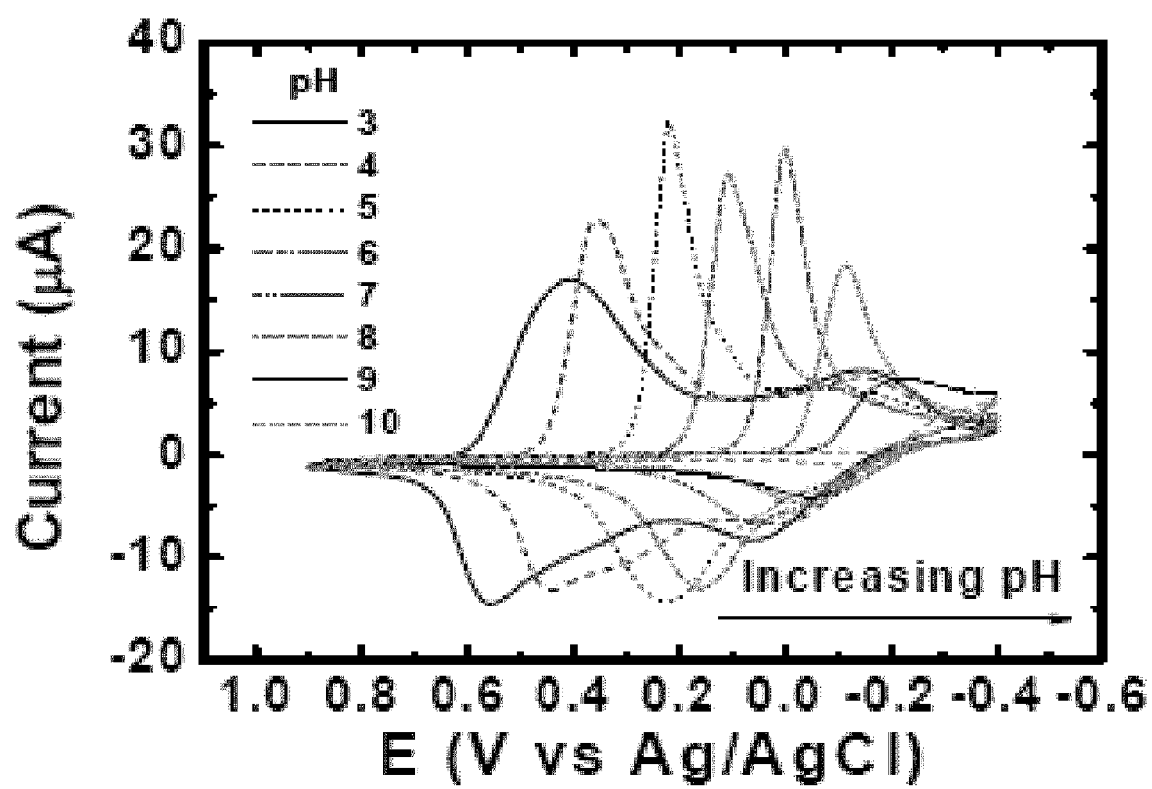
FIG. 3 shows a graph of the current versus voltage (E) results for a bisphosphonic acid-modified ITO/pristine PANI-PAAMPSA structure.
Figure 4:
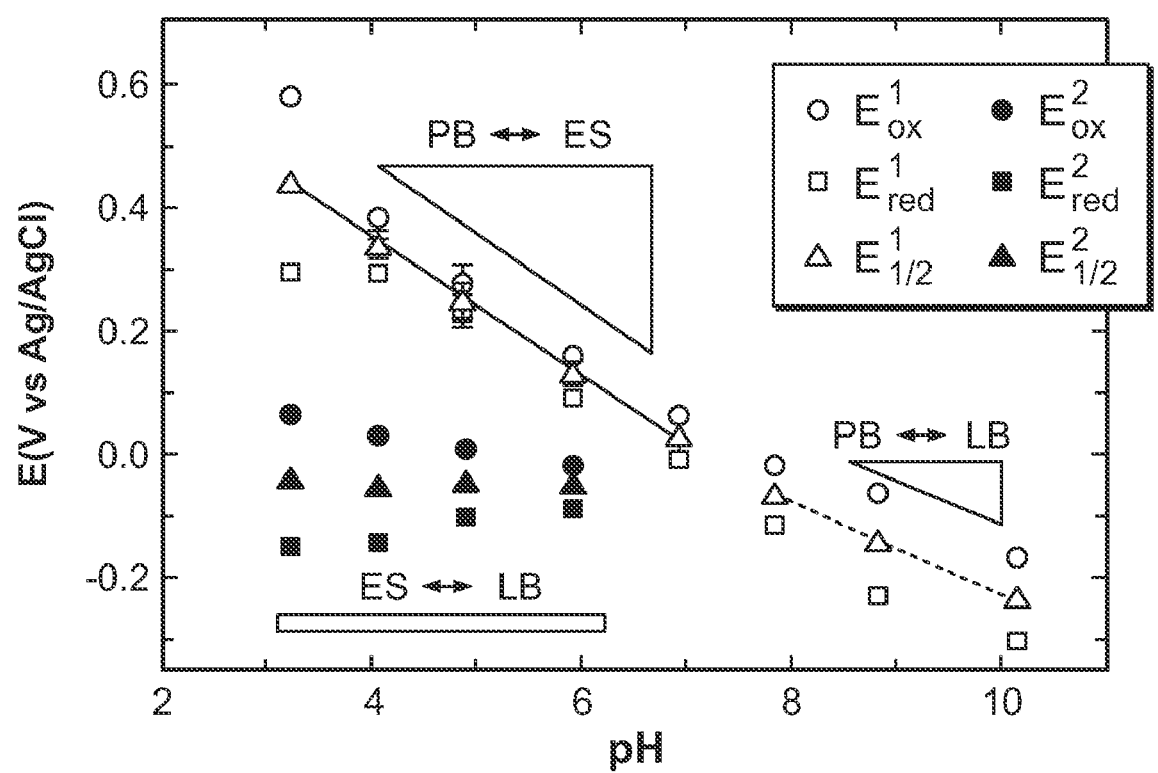
FIG. 4 shows a plot of the voltage versus pH for the structures described in FIG. 3.

FIG. 3 shows a graph of the current versus voltage results for a bisphosphonic acid-modified ITO/pristine PANI-PAAMPSA, wherein the current versus voltage is reported for the structure at varying pH values. FIG. 4 plots the voltage versus pH for those same structures, and tracks the pH dependence of the redox potentials.

Figure 5A:
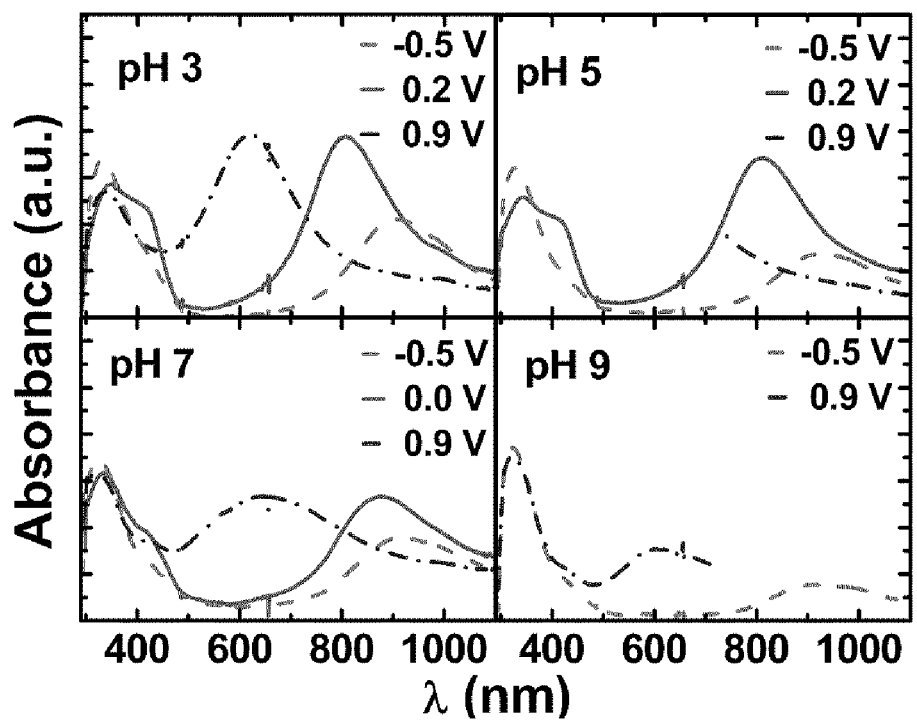
FIG. 5(a) shows the UV-Vis results for an electrochromic structure having a pristine PANI-PAAMPSA film.
Figure 5B:
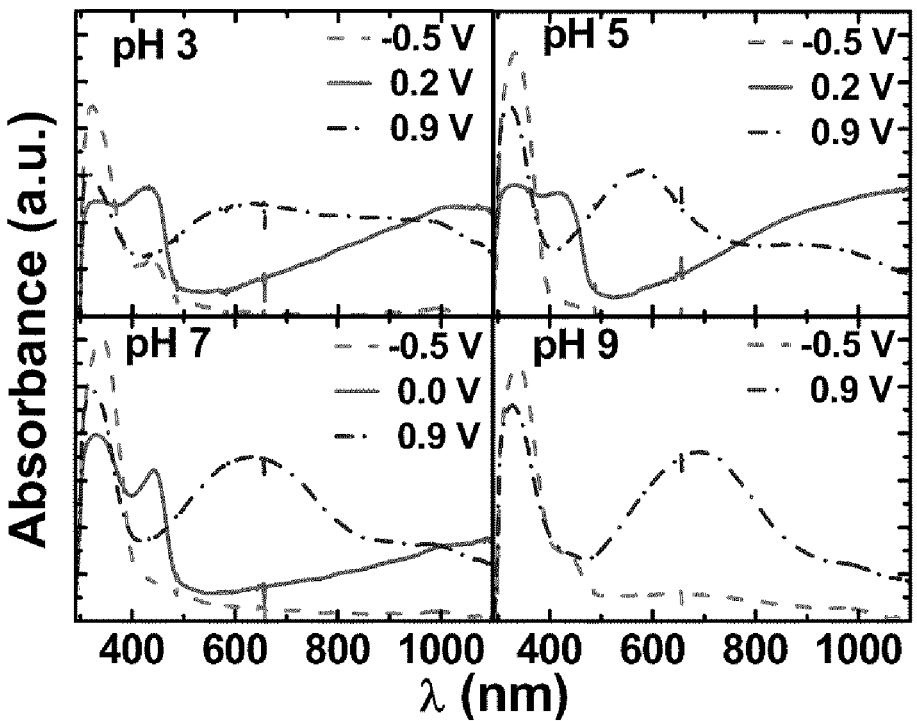
FIG. 5(b) shows the UV-Vis results for an electrochromic structure having a DCA-treated PANI-PAAMPSA film.

FIG. 5 shows the UV-Vis spectra collected for certain electrochromic structures as a function of potential across a broad pH range. For example, FIG. 5(a) shows the results for an electrochemical structure having a pristine PANI-PAAMPSA film, while FIG. 5(b) shows that for a DCA-treated PANI-PAAMPSA film. FIG. 5(b) suggests an ease of reduction and transition between oxidation states, while retaining electroactive stability, for the DCA-treated PANI-PAAMPSA structures. On the other hand, the results of FIG. 5(a) show the pristine PANI-PAAMPSA structures resist complete reduction over the same range.

Figure 6:
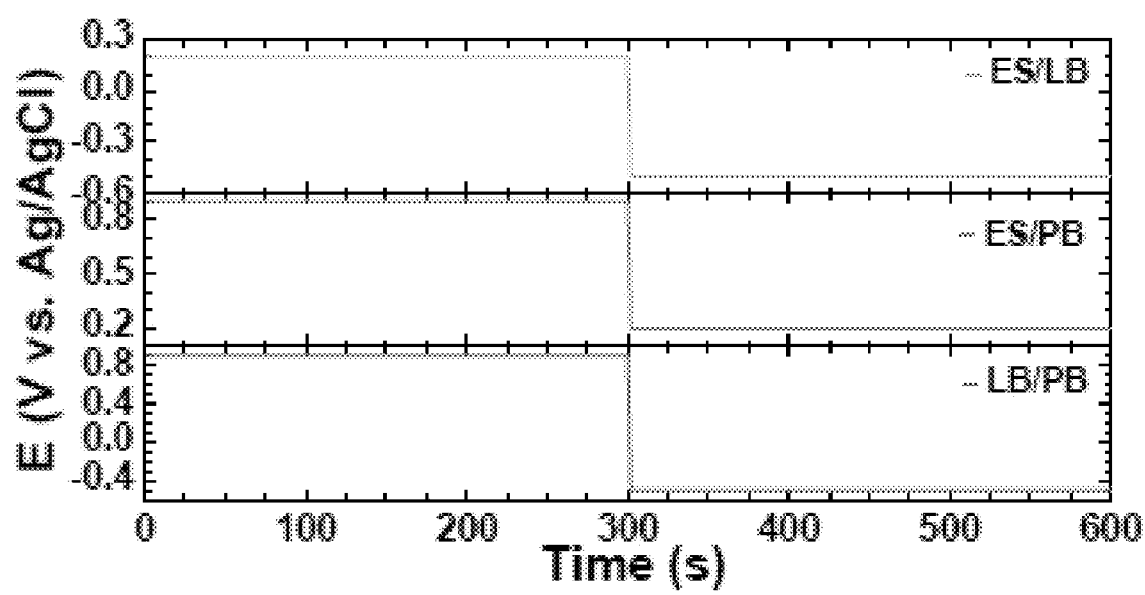
FIG. 6 shows a graph tracking voltage versus time (s) for a DCA-treated PANI-PAAMPSA structure, wherein the chronocoulometry is performed across a range of pH 3-9.

FIG. 6 shows a graph tracking voltage versus time (s) for a DCA-treated PANI-PAAMPSA structure prepared in manner consistent with the methods described herein, wherein the chronocoulometry is performed across a range of pH 3-9. Applied voltages were stepped back and forth between oxidizing and reducing potentials: ES/LB and ES/PB at 0.2 V (0.0 for pH 7) to −0.5 V and 0.9 V, respectively; and LB/PB at −0.5 V to 0.9 V. Potential steps were repeated 6 times to verify stability and reproducibility. The wavelength at which absorbance is most dynamic determined for each of the three spectral regions of interest (see FIG. 11).

Figure 7:
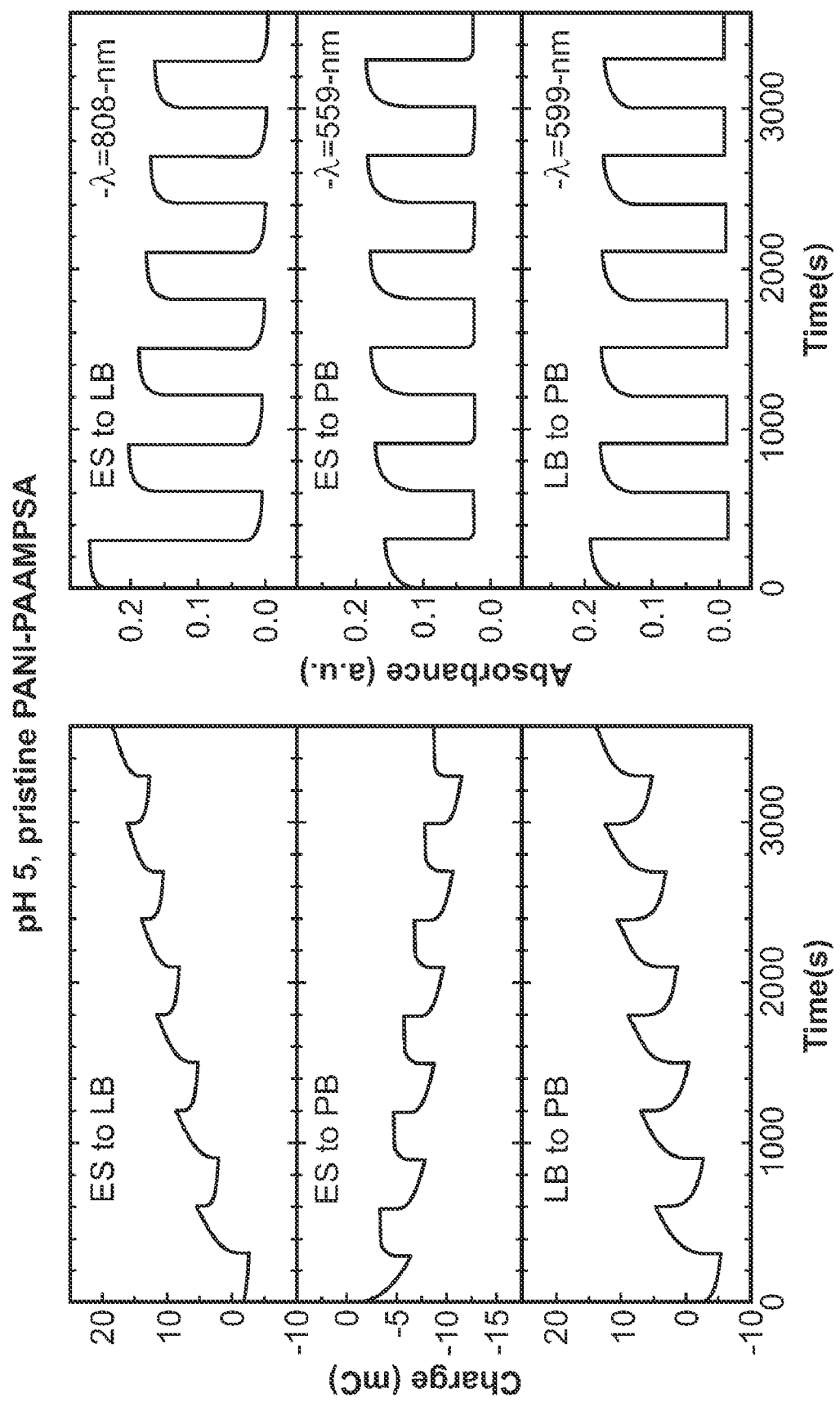
FIG. 7 shows the electrochemical and electrochromic response of a structure comprising a pristine PANI-PAAMPSA film at 5 pH.
Figure 8:
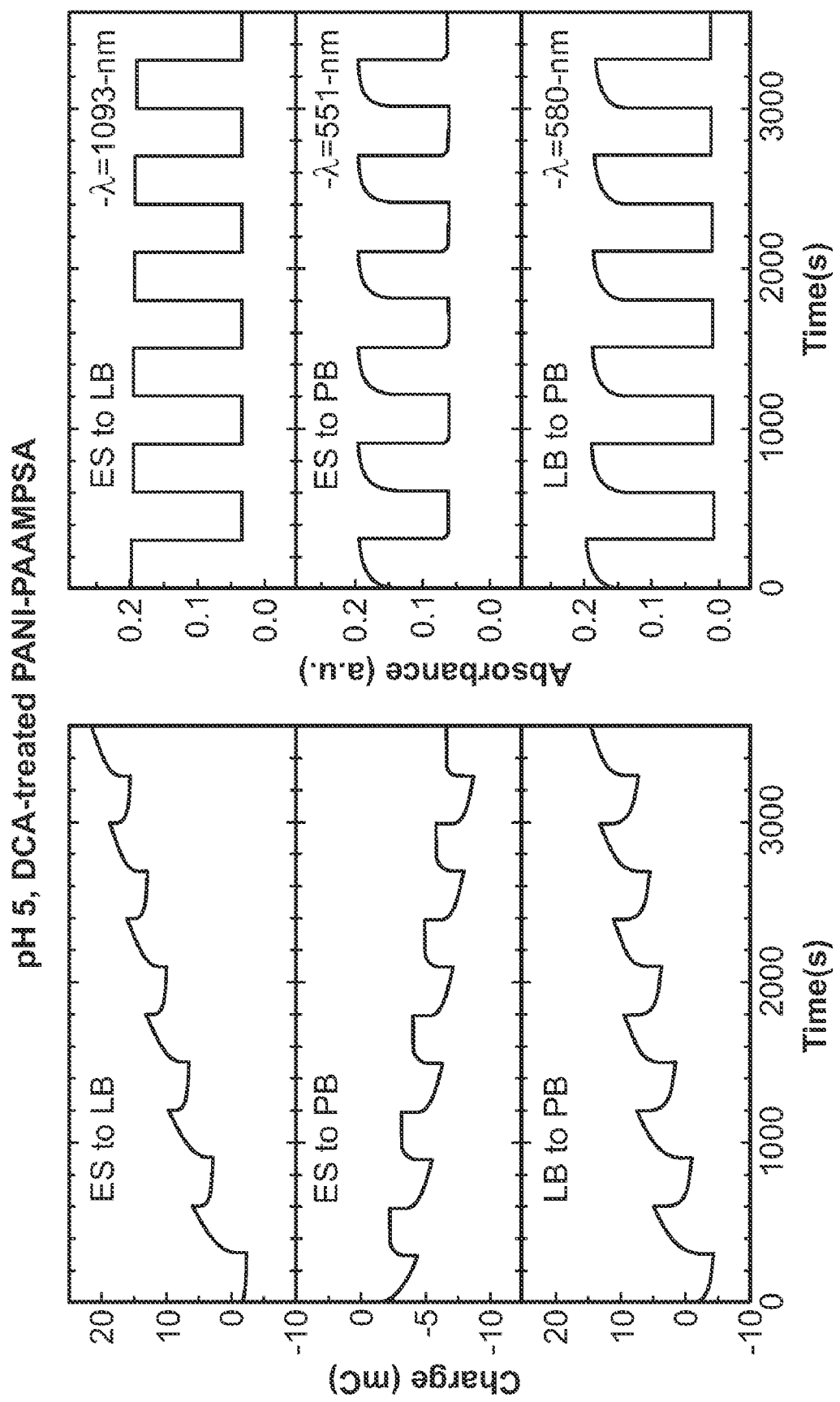
FIG. 8 shows a graph of the electrochemical and electrochromic response of a structure comprising a DCA-treated PANI-PAAMPSA film at 5 pH.

FIG. 7 shows the electrochemical and electrochromic response of a structure comprising a pristine PANI-PAAMPSA film at 5 pH, indicating a degradation of optical response over the course of the experiment. On the other hand, the DCA-treated PANI-PAAMPSA structure of FIG. 8 exhibits an optical response that is substantially unchanged.

Figure 9:
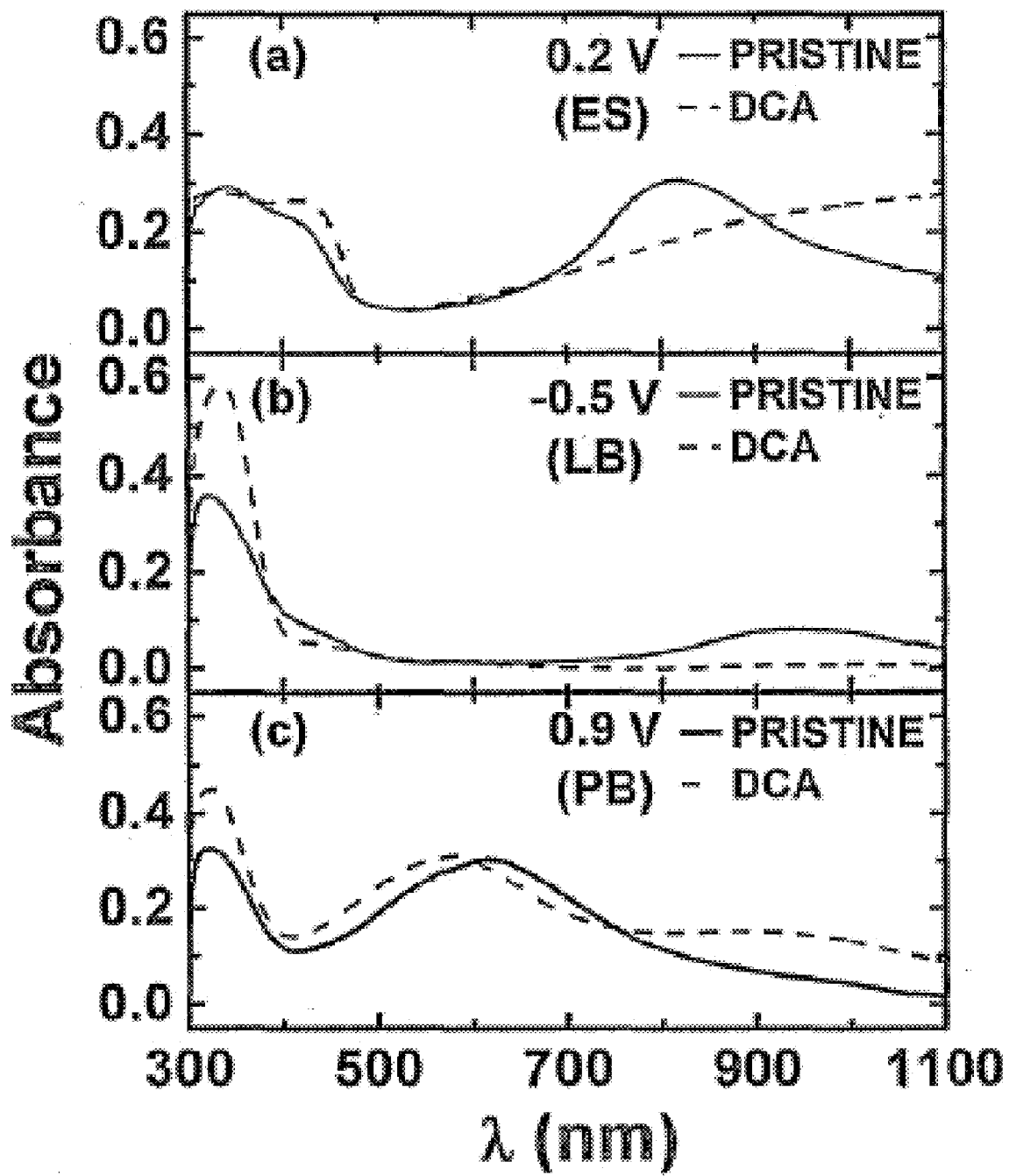
FIG. 9 shows the UV-Vis/NIR absorption spectra for the three stable oxidation states of the PANI-PAAMPSA structures before (solid line) and after DCA treatment (dashed line).

FIG. 9 shows the UV-Vis/NIR absorption spectra for the three stable oxidation states of the PANI-PAAMPSA structures before (solid line) and after DCA treatment (dashed line). The spectra associated with ES (a) were obtained from 220 nm thick films prior to potential cycling. The spectra associated with LB (b) and PB (c) were obtained from 220 nm thick films at the end of 5 minute potential holds at −0.5 V and 0.9 V (vs. AG/AgCl), respectively.

Figure 10:
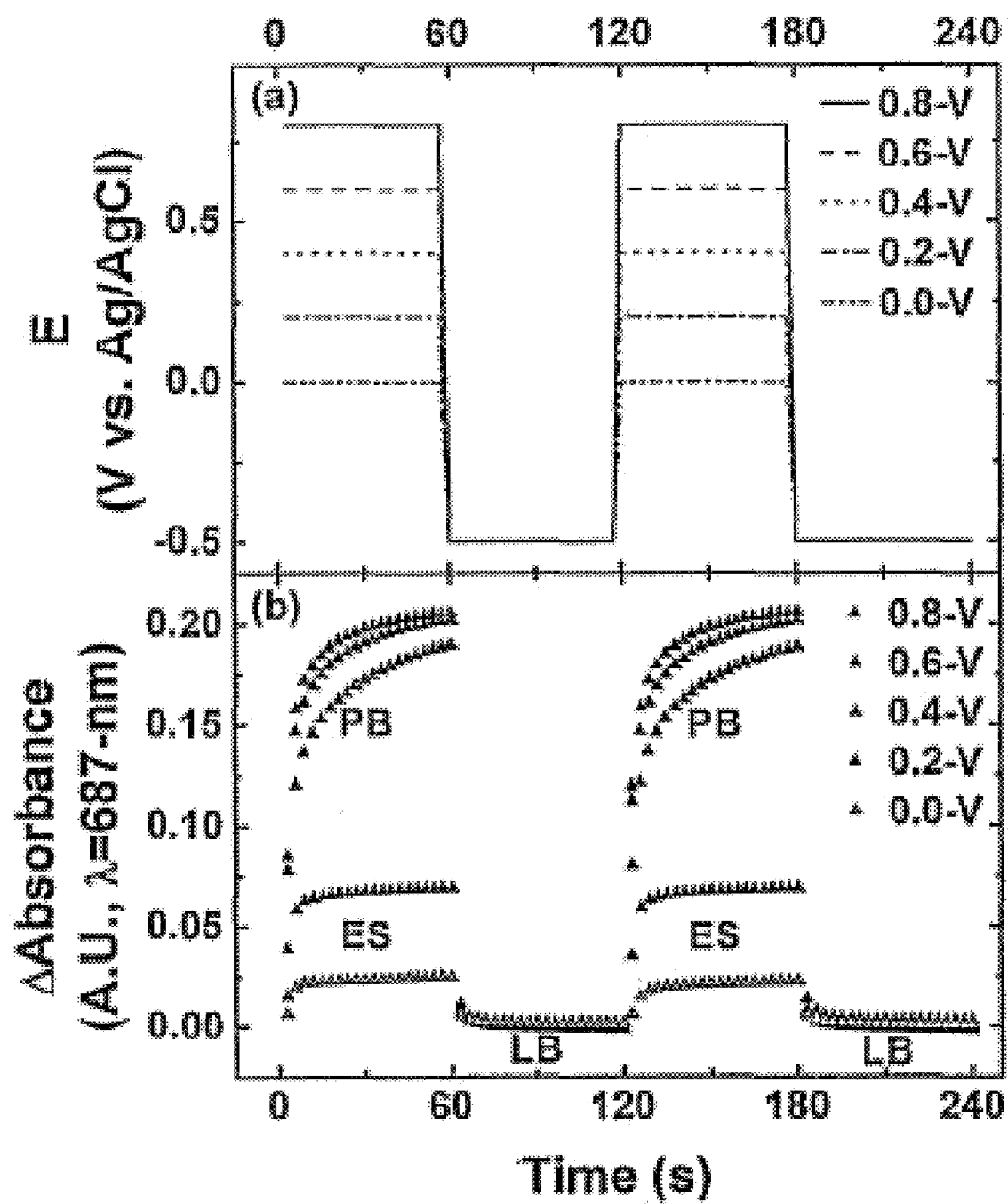
FIG. 10 shows a panel graph illustrating the chromic response of a pristine PANI-PAAMPSA structure to a series of potential step waveforms.

FIG. 10 shows a panel graph illustrating the chromic response of pristine PANT-PAAMPSA to a series of potential step waveforms. Individual potential waveforms are shown in (a). Switching experiments were undertaken at varying potentials ranging from 0.0 to 0.8 V (vs. Ag/AgCl) in 0.2 V increments. After holding at these potentials for 60 seconds, the potential was switched to −0.5 V vs. Ag/AgCl for 60 seconds to induce transitions to the LB state of PANI-PAAMPSA. As illustrated by the potential waveforms in (a), the films were cycled again. A fresh film was used during each experiment comprising two 120 second cycles. (b) shows the optical response of PANI-PAAMPSA to the applied potential. Absorption changes were tracked at 687 nm as the film was subjected to the potential steps.

Figure 11:
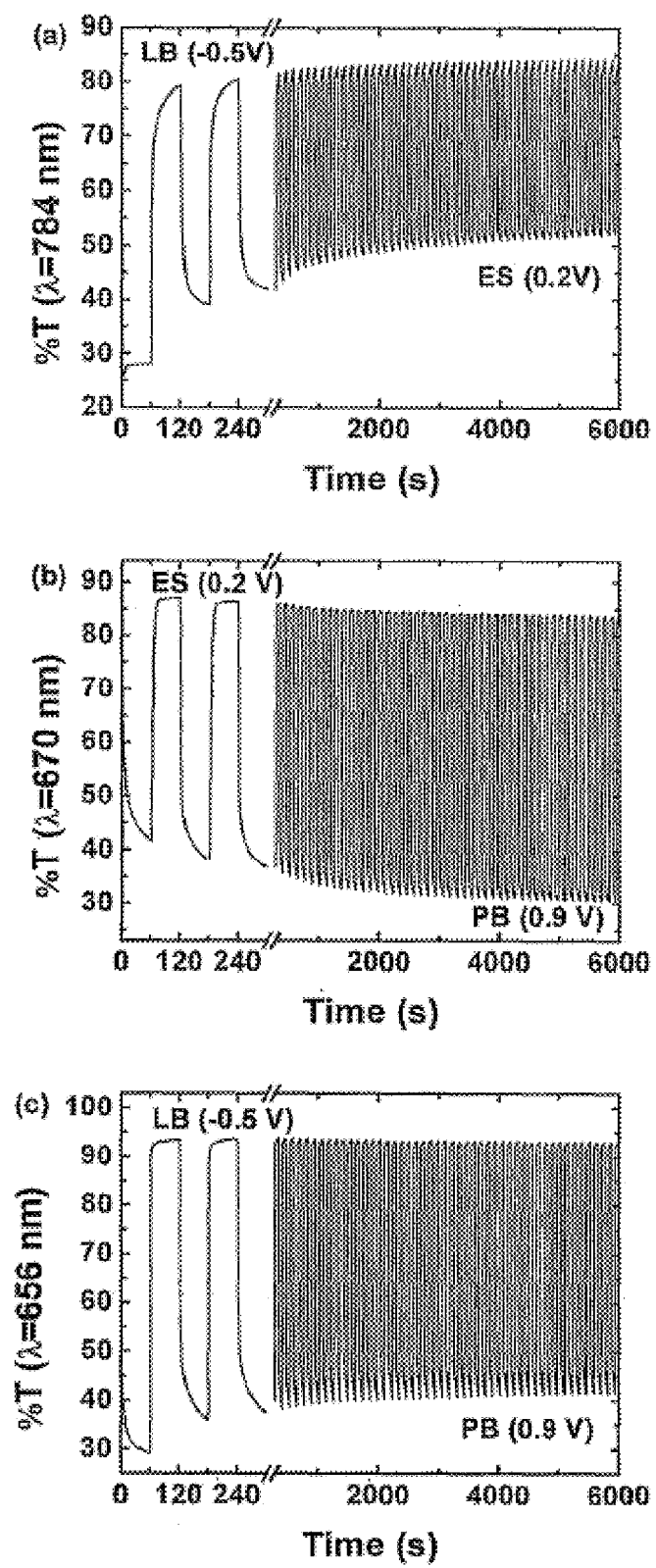
FIG. 11 shows a graph of the optical response of a pristine PANI-PAAMPSA structure upon switching between varying voltages and the corresponding oxidative transitions.

To investigate the stability and reversibility of the polyelectrochromic switching of PANI-PAAMPSA, a single pristine PANI-PAAMPSA film was subjected to a consecutive series of ES/LB, ES/PB, and PB/LB cycles. In each series, the same 600 nm film was cycled 50 times between the predetermined switching potentials at 120 seconds per cycle. In FIG. 11, (a) shows the optical response of pristine PANI-PAAMPSA upon switching between 0.2 and −0.5 V, corresponding to transitions between ES and LB, respectively. Absorbance was tracked by changes in transmission. Transmission changes were tracked at the most dynamic wavelength of 784 nm. (b) shows the optical response of pristine PANI-PAAMPSA upon switching between 0.9 and 0.2 V, corresponding to transitions between PB and ES, respectively. The most dynamic wavelength of the first cycle's spectra was found to be 670 nm. (c) shows the optical response of PANI-PAAMPSA upon switching between 0.9 and −0.5 V, corresponding to the transition between PB and LB, respectively. The most dynamic region of the first cycle's spectral response was observed at $\lambda=656$ nm.

Figure 12:
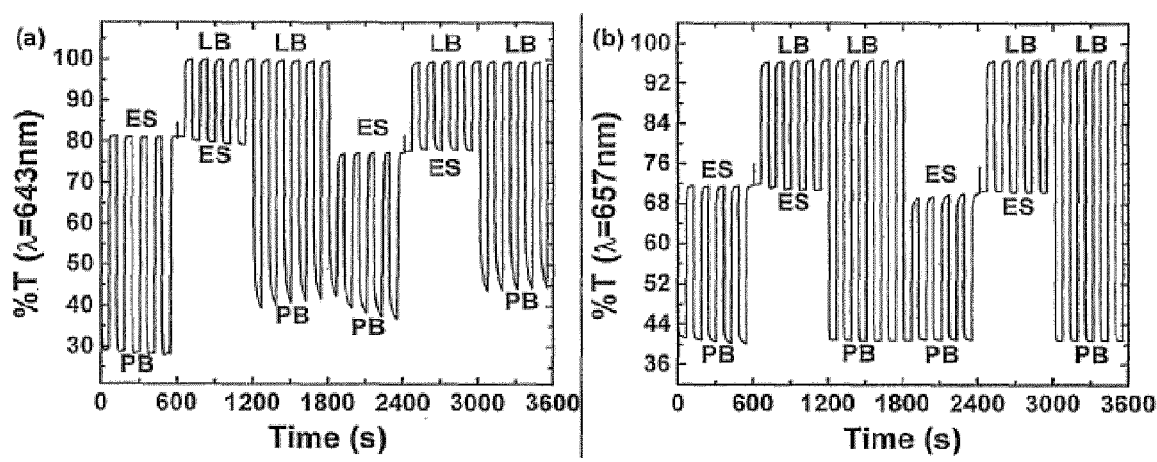
FIG. 12 shows a graph plotting the transmission response of (a) pristine and (b) DCA-treated PANI-PAAMPSA films within the visible spectrum at 643 and 657 nm, respectively, versus time (s).

To probe the influence of DCA treatment on the stability and reversibility of polyelectrochromism in PANI-PAAMPSA, a series of switching cycles on pristine and DCA-treated films was performed. A consecutive series of five ES/PB, ES/LB, and LB/PB cycles were applied to each 600 nm thick film; the series was subsequently repeated to check for hysteresis. The cycles consisted of 60-second holds at the predetermined reduction and oxidation potentials. The maximum spectral contrast throughout the experiment was determined to be at 643 nm for the pristine film. The DCA-treated film exhibited maximum contrast at a comparable wavelength (657 nm). Thus, FIG. 12 shows the transmission response of (a) pristine and (b) DCA-treated PANI-PAAMPSA films within the visible spectrum at 643 and 657 nm, respectively. For the pristine films, switching times were ~5 seconds for transitions to PB and below 1 second for transitions to ES. Stable transitions between ES and LB appeared to occur with fast switching times (<1 second) between t=601 and t=1200 seconds. Between t=0 and 600 seconds, the DCA-treated film also exhibits stable switching between ES and PB forms. Switching times for transitions to PB (~5 seconds) and ES (<1 second) are similar to those of pristine PANI-PAAMPSA. Stable switching between the ES and LB oxidation states is observed between t=601 and t=1200 seconds, though the DCA-treated film exhibits superior contrast relative to the pristine film. Switching times are <1 second for transitions to both LB and ES. During 1201≦t≦1800 seconds, the DCA film exhibits fast (<1 second) and stable transitions between LB and PB forms.

Figure 13:
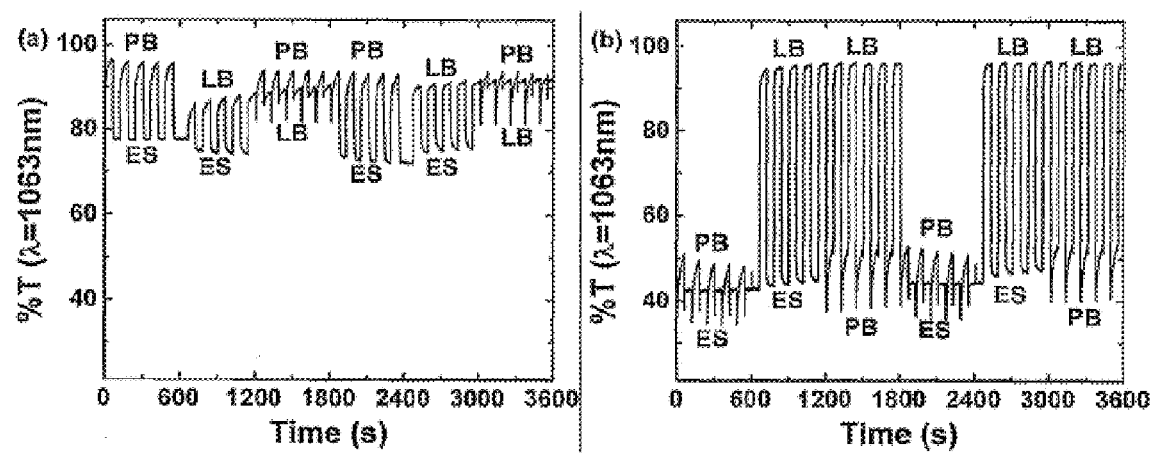
FIG. 13 shows a graph tracking the switching characteristics of (a) a pristine PANI-PAAMPSA film at $\lambda$=1063 nm versus time (s), while (b) shows the same for a DCA treated PANI-PAAMPSA structure.

To probe the viability of NIR, switching in pristine and DCA-treated PANI-PAAMPSA, stability and rapidity of switching at longer wavelengths were also compared. In FIG. 13, (a) shows the switching characteristics of a pristine PANI-PAAMPSA film at $\lambda=1063$ nm, the wavelength at which DCA treated PANI-PAAMPSA structure exhibits superior contrast when switching between oxidation states. During the first time interval (0≦t≦600 seconds), the pristine film exhibits a contrast to ES that occurs in less than 1 second, but transitions to PB take in excess of 10 seconds. For 0≦t≦600 seconds, switching to the ES state occurs in less than 1 second, though transitions to the LB state proceed on 20-30 second time scales. Between t=1201 and t=1800 seconds, the pristine film is switched between the LB and PB oxidation states. Switching times are on the order of 20-30 seconds.

The polyelectrochromic behavior of pristine PANI-PAAMPSA in the NIR region in FIG. 13 provides poor contrast, slow switching speeds, and the transmittance appears to be history dependent. The DCA-treated film, however, exhibits high contrast, fast switching speeds, and stable polyelectrochromism in the NIR region. (b) shows the optical response of DCA-treated PANI-PAAMPSA at 1063 nm. Transitions between ES and PB occur for $0 \leq t \leq 600$ seconds. Transitions to ES occur in less than 1 second, while switching times of 20-30 seconds are associated with transitions to PB. However, when cycling between LB and ES for $601 \leq t \leq 1200$, the LB/ES transition offers large and stable contrast and switching times below 5 seconds. Between t=1201 and t=1800 seconds, the film. is cycled between PB and LB. Transitions to the LB state occur below 5 seconds, while transitions to PB exceed 30 seconds.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An electrochromic structure comprising:
   at least one conductive material; and
   a PANI-PAAMPSA material comprising a PANI-PAAMPSA complex capable of undergoing stable transitions between emeraldine salt (ES), leucomeraldine base (LB), and penigraniline base (PB) oxidation states, wherein said stable transitions between oxidation states are reversible.

2. The electrochromic structure of claim 1, wherein the stable transitions are transitions between oxidation states that lack a substantial change in the optical response for each state after repeated switching cycles.

3. The electrochromic structure of claim 1, wherein the lack of a substantial change in the optical response is characterized by a less than 1% change in transmittance exhibited by each of the ES, LB, and PB oxidation states.

4. The electrochromic structure of claim 3, wherein transmittance is measured at a wavelength of 657 nm.

5. The electrochromic structure of claim 3, wherein the lack of a substantial change in the optical response is observed after the PANI-PAAMPSA complex undergoes at least 50 switching cycles between oxidation states.

6. The electrochromic structure of claim 3, wherein the lack of a substantial change in the optical response is observed after the PANI-PAAMPSA complex undergoes 30 switching cycles, which comprise two consecutive series of five ES/PB, five ES/LB, and 5 LB/PB cycles.

7. The electrochromic structure of claim 4 wherein an ES/PB transition exhibits a contrast in transmittance of greater than 30%.

8. The electrochromic structure of claim 4 wherein an ES/LB transition exhibits a contrast in transmittance of greater than 25%.

9. The electrochromic structure of claim 1, wherein the stable transitions are effected by applying a potential pulse.

10. The electrochromic structure of claim 9, wherein the stable transitions occur when cycling between a potential of a ±1 V window.

11. The electrochromic structure of claim 10, wherein a transition between ES and LB occurs upon switching between 0.2 and −0.5 V.

12. The electrochromic structure of claim 10, wherein a transition between ES and PB occurs upon switching between 0.2 and 0.9 V.

13. The electrochromic structure of claim 10, wherein a transition from ES to PB occurs in 5 seconds.

14. The electrochromic structure of claim 10, wherein a transition from PB to ES occurs in less than 1 second.

15. The electrochromic structure of claim 10, wherein a transition from ES to LB occurs in less than 1 second.

16. The electrochromic structure of claim 10, wherein a transition from LB to ES occurs in less than 1 second.

17. The electrochromic structure of claim 1, wherein the at least one conductive material comprises a transparent material.

18. The electrochromic structure of claim 17, wherein the at least one conductive material comprises a material selected from ITO, fluoride-doped tin oxide, and aluminum-doped zinc oxide.

19. The electrochromic structure of claim 1, wherein said structure is prepared through a process comprising the disposal of the PANI-PAAMPSA material on the conductive material.

20. The electrochromic structure of claim 19, wherein the conductive material is coated with bisphosphonic acid prior to disposal of the PANI-PAAMPSA material.

21. The electrochromic structure of claim 19, wherein said structure is prepared through a process comprising the structural rearrangement of the PANI-PAAMPSA material.

22. The electrochromic structure of claim 21, wherein the structural rearrangement of the PANI-PAAMPSA material occurs after said PANI-PAAMPSA material is disposed on the conductive material.

23. The electrochromic structure of claim 22, wherein the structural rearrangement of the PANI-PAAMPSA material is induced by solvent annealing in at least one acid.

24. The electrochromic structure of claim 23, wherein the at least one acid comprises dichloroacetic acid.

25. The electrochromic structure of claim 1, wherein the stable transitions between oxidation states occurs across a range from 3 pH to 10 pH.

26. The electrochromic structure of claim 1, wherein the PANI-PAAMPSA complex exists in the ES state from 0.0 V to 0.2 V at a pH of 7.

27. The electrochromic structure of claim 1, wherein said structure further comprises at least one second conductive material.

28. The electrochromic structure of claim 27, wherein the PANI-PAAMPSA material is positioned between the at least one conductive material and the at least one second conductive material.

29. The electrochromic structure of claim 1, wherein said structure is used in a device comprising electronic glass tints, electronic window tints, electronic mirror tints, electronic signage, or an electronic display device.

30. A method of preparing an electrochromic structure, comprising:
   depositing a water-dispersible PANI-PAAMPSA material on a conductive material; and
   inducing the structural rearrangement of the deposited PANI-PAAMPSA material, wherein the resulting electrochromic structure comprises a PANI-PAAMPSA complex capable of undergoing stable transitions between emeraldine salt (ES), leucomeraldine base (LB), and penigraniline base (PB) oxidation states, wherein said stable transitions between oxidation states are reversible.

31. The method of claim 30, wherein the conductive material is transparent.

32. The method of claim 31, wherein the conductive material is selected from ITO, fluoride-doped tin oxide, and aluminum-doped zinc oxide.

33. The method of claim 30, wherein the conductive material is modified with at least one acid.

34. The method of claim 33, wherein the at least one acid comprises bisphosphonic acid.

35. The method of claim 30, wherein the structural rearrangement of the PANI-PAAMPSA material is induced by solvent annealing in at least one acid.

36. The method of claim 35, wherein the at least one acid comprises DCA.

37. The method of claim 30, wherein the water-dispersible PANI-PAAMPSA material is cast onto the conductive material from an aqueous medium.

38. The method of claim 30, wherein the PANI-PAAMPSA complex exists in its ES state upon deposition of the PANI-PAAMPSA material on the conductive material.

* * * * *